(12) United States Patent
Beck et al.

(10) Patent No.: US 7,468,669 B1
(45) Date of Patent: Dec. 23, 2008

(54) RFID PATCH PANELS AND CABLES

(75) Inventors: Alexander John Gray Beck, Frenchs Forest (AU); Gordon R. Brunson, Broomfield, CO (US); Jonathan R. Yee-Hang Choy, Wahroonga (AU); Alexander Martin Scholte, Chatswood (AU); David Preshan Thambiratnam, Ashfield (AU)

(73) Assignee: Avaya Technology Corp., Basking Ridge, NJ (US)

( * ) Notice: Subject to any disclaimer, the term of this patent is extended or adjusted under 35 U.S.C. 154(b) by 451 days.

(21) Appl. No.: 11/224,796

(22) Filed: Sep. 12, 2005

Related U.S. Application Data

(60) Provisional application No. 60/692,870, filed on Jun. 21, 2005.

(51) Int. Cl.
*G08B 13/14* (2006.01)
(52) U.S. Cl. .................. 340/572.1; 340/5.22; 340/5.25; 340/10.22; 340/10.25; 235/375; 235/492
(58) Field of Classification Search ............. 340/572.1, 340/10.51, 10.52, 5.22, 5.25; 235/375, 492
See application file for complete search history.

(56) References Cited

U.S. PATENT DOCUMENTS

| | | |
|---|---|---|
| 4,890,102 A | 12/1989 | Oliver |
| 4,978,317 A | 12/1990 | Pocrass |
| 5,081,627 A | 1/1992 | Yu |
| 5,198,664 A | 3/1993 | Fayfield |
| 5,249,183 A | 9/1993 | Wong et al. |
| 5,577,023 A | 11/1996 | Marum et al. |
| 5,741,152 A | 4/1998 | Boutros |
| 5,764,043 A | 6/1998 | Czosnowski et al. |
| 6,577,243 B1 | 6/2003 | Dannenmann et al. |
| 6,968,994 B1* | 11/2005 | Ashwood Smith .......... 235/375 |
| 7,170,393 B2* | 1/2007 | Martin ....................... 340/10.1 |
| 2007/0102505 A1* | 5/2007 | Yokota et al. ............ 340/572.1 |

OTHER PUBLICATIONS

Java Card Special Interest Group www.javacard.org/others/smart 8 pages printed Apr. 28, 2005.
Knight; "Patchwork design may give speedier chips"; website www.newscientist.com/article.ns?id=4189 3 pages printed Apr. 28, 2005.

(Continued)

*Primary Examiner*—George A Bugg
*Assistant Examiner*—Samuel J Walk
(74) *Attorney, Agent, or Firm*—Sheridan Ross P.C.

(57) ABSTRACT

The present invention provides a device, system, and method for identifying interconnect cables used in a network and the locations in the network where the interconnect cables are deployed. The identification information may be used to audit, for example, patch panel connections in a computer or communications network. The preferred embodiments include RFID transponders incorporated at the cable ends. An RFID scanner is used to interrogate the transponders, and the retrieved information is stored and acted on as appropriate. In a first embodiment, secondary contacts are used on the network components for mating with primary contacts on the cable ends in order to generate information as to the location where the cable ends are connected. In a second embodiment, memory modules are incorporated in the components for providing information reflective of connection locations.

4 Claims, 3 Drawing Sheets

OTHER PUBLICATIONS

SYSTIMAX iPatch System website www.allnet.co.uk/solutions/cabling/products_services/avaya_systemax/ipatch_system... 1 page printed on Apr. 28, 2005.

Lasermate Group, Inc. Http://www.lasermate.com/ELproducts.htm; printed Sep. 13, 2005; 3 pages.

* cited by examiner

RFID PATCH PANELS AND CABLES

CROSS-REFERENCE TO RELATED APPLICATION

This application claims the priority of U.S. Provisional Application No. 60/692,870 filed on Jun. 21, 2005, the entire disclosure of which is hereby incorporated by reference.

FIELD OF THE INVENTION

The present invention is directed to identification of cables that carry electronic signals, and more particularly, the present invention is directed to the identification of patch cables, such as those used in computer and communication networks.

BACKGROUND OF THE INVENTION

Computer and communication networks rely on patch or interconnect cables to connect components of the networks to one another. To facilitate troubleshooting, maintenance, and reconfiguration of signal paths used within the networks, it is critical that each and every interconnect cable be identified as to its origination and termination. This identification requires recordation of each and every connection. In networks with a large number of interconnected components, keeping accurate track of and managing the connections becomes a significant effort. Network problems may occur if interconnections are not accurately and timely recorded.

In the maintenance of patch panels, paper-based documentation is still widely used. With large networks, the documentation may be recorded in the form of record books where each of the connections are manually recorded. Paper-based documentation obviously has disadvantages in terms of required effort and accuracy.

Verifying existing connections when network problems arise can be extremely time consuming. For network auditing, or in the attempt to identify a particular cable within a large network, the recorded documentation provides assistance. However, the documentation still requires an extremely time consuming physical inspection of connections to confirm the network status.

Automated systems have been developed for monitoring and recording cable connections; however, these known systems require specialized patch panels that monitor connections at the panel, displays on patch panel racks, and LEDs on patch panel ports. Additionally, such systems require special software for administering the patch panel connections. These systems may still be deficient in providing the capability to locate a cable that is connected to the wrong port, that is, connected to a port other than the port designated.

RFID is a generic term for technologies that use radio waves to automatically identify objects. For example, in the livestock industry, RFID cattle tags have been used for a number of years. Passive and active RFID transponders or tags contain coiled antennas to enable them to receive and respond to radio-frequency queries from an RFID reader or transceiver (which also includes an antenna). Once queried, the RFID transponder generates a radio wave signal containing information concerning the tagged object. The transceiver converts the radio waves returned from the RFID transponder into a form that can be stored and manipulated on a computer, such as digital bytes of data. Passive RFID transponders do not have a power supply. A minute electrical current induced in an antenna of the transponder by the incoming radio-frequency query scan provides enough power for the transponder to transmit a response in the form of the stored data. Active RFID transponders have an on-board power source and may have longer ranges and larger memories than passive tags. Semi-passive RFID transponders may use an on-board power source to run the transponder's circuitry, but communicate with the reader by drawing power from the radio wave generated by the reader, like a passive transponder. Memory chips in RFID transponders may be configured as read-write or read-only, depending upon the particular application. Particular advantages to RFID identification systems are that such systems are reliable, cost effective, and the components can be very small in size.

SUMMARY OF THE INVENTION

In accordance with the present invention, a patch or interconnect cable is provided with RFID transponders that quickly and easily allows a user to identify where the particular cable is used in a network, and which components in the network are connected by the cable.

The interconnect cable includes end connectors attached at each end of the cable enabling it to be plugged into the designated panels/components. Each end connector incorporates an RFID transponder. In a first embodiment, a set of primary contacts extend from the transponder and the contacts are electrically coupled to a memory chip or element of the transponder. Ends of the primary contacts are exposed for connection to a set of secondary contacts found on or adjacent to a panel/component port to which the cable is connected. Each panel or component port that receives the cable has a unique set of the secondary contacts so that when the primary contacts of the RFID transponder make contact with the secondary contacts of the particular port, a circuit is completed that generates storage of a unique identifier in the memory element of the RFID transponder. This unique identifier includes not only the identification of the particular cable, but also the particular port location where the cable is connected in the network. Thus, there are two primary types of data that are recorded, namely, data that identifies the particular cable end, and data that identifies the particular connection port in the network connected to the cable end. In manufacturing of the RFID transponders, each transponder would have stored in its memory element data bits reflective of a unique identifier such as a serial number. Each connection port in a particular panel/component would have its own unique configuration of the secondary contacts so that when contact is made between the primary and secondary contacts, the unique identifier is generated reflective of a particular panel/component port location of a particular panel/component. When the RFID transponder is queried by an RFID reader, the unique identifier is transmitted to the reader and is recorded by the reader. Each end of each cable used in a network can therefore be recorded as to its location within the network to include which connection ports of panels/components in the network are interconnected by the cable ends. The information retrieved by the RFID reader can be downloaded to a central database thus providing an accounting of the configuration of the network cables and panels/components. Preferably, the RFID reader is provided in the form of a portable device that may be hand carried to the work site. The reader is simply passed over or "wanded" over the RFID transponder of interest, and the reader receives and records the unique identification signal generated by the transponder.

In a second preferred embodiment, in lieu of physical contact between the primary and secondary contacts to complete a circuit generating a unique identification signal, capacitive coupling may be used between the panel/component port and the RFID transponder to generate the unique identifier for storage in the RFID transponder.

Capacitive coupling generally refers to data transmission between two elements wherein digital information can be transferred directly and no modulation is required. Capacitive coupling is known in various applications such as contactless "smart cards" used for entry access to a building.

In order to incorporate capacitive coupling in the second embodiment, a first pair of conductors are provided within or adjacent each panel/component connection port, and these conductors are electrically coupled to a memory element incorporated within the panel/component. Each connection port has its own unique identifier stored in the panel/component memory element, preferably as bits of digital data. Each identifier in the panel/component memory element identifies, for example, the particular patch panel or component position within the network. A second pair of conductors are incorporated in the RFID transponder, and these conductors are electrically coupled to the RFID memory element. When a voltage signal is placed across the first pair of conductors, a charge separation occurs that generates an electric field. The electric field extends beyond the surface(s) of the connection port where the first pair of conductors are located, and induces another charge separation on the second pair of conductors in the RFID transponder. This induced charge separation results in transmission of data from the memory element of the connection port to the memory element of the RFID transponder. The transmitted data is stored in the memory element of the transponder, and when the transponder is queried, it generates the unique identification signal including data reflective of panel/component position and cable identification.

In one aspect of the present invention, it may be considered an interconnect cable with RFID identification capability. In another aspect of the present invention, it may be considered a combined interconnect cable and patch panel/component identification system. In yet another aspect of the present invention, it may be considered as a method for identifying the location and identity of interconnect cables and patch panel/components of a network.

Additional features and advantages of the present invention will become more apparent from a review of the following detailed description, taken in conjunction with the accompanying drawings.

DETAILED DESCRIPTION

Figure 1:
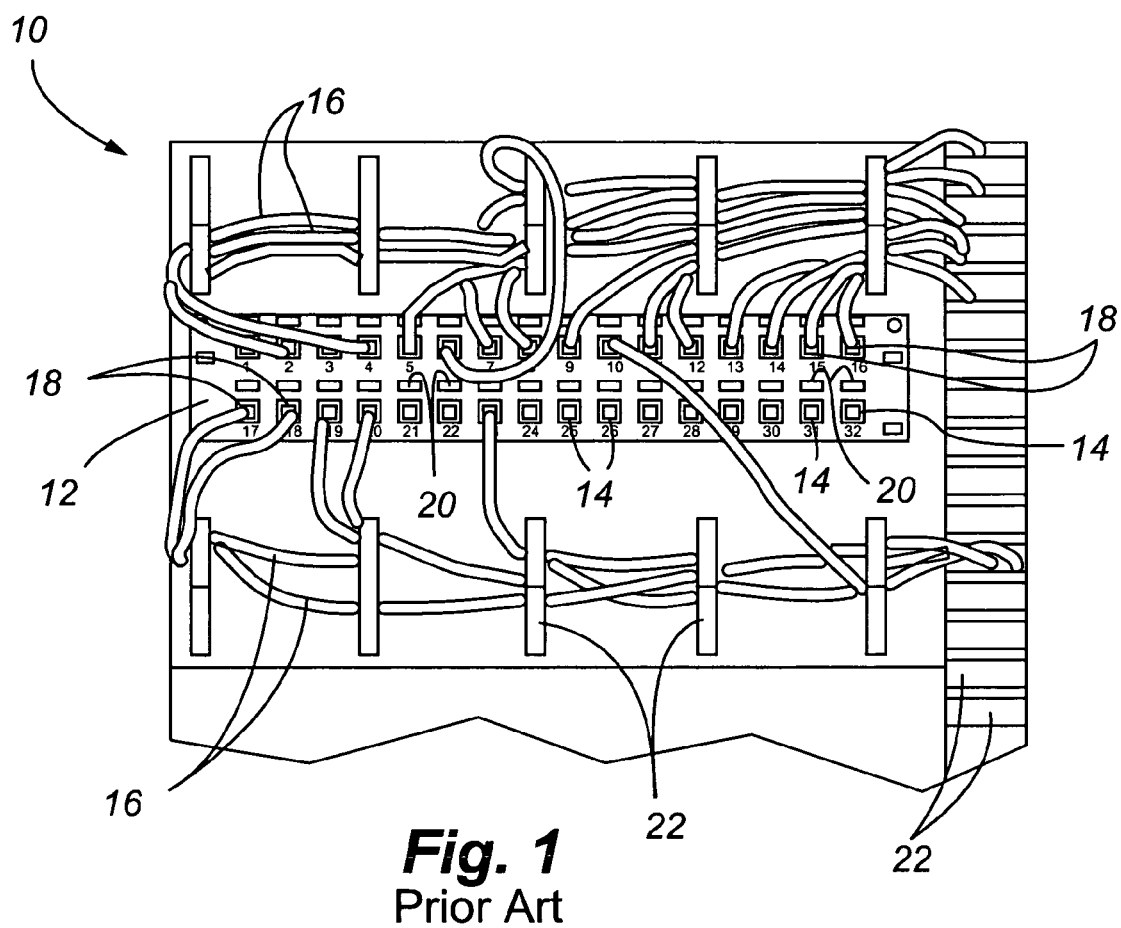
FIG. 1 illustrates a standard patch panel including a plurality of interconnect cables connected to the patch panel.

Referring to FIG. 1, a prior art patch panel 10 is shown having a mounting plate 12 along with a plurality of numbered connector ports 14 integrated therein. Interconnect cables 16 have corresponding end connectors 18 that are plugged in the respective connector or connection ports 14. For clarity of illustration, not all of the connector ports are shown with corresponding interconnect cables. The connector ports 14 may be identified by their corresponding number, and may further include additional visual port identifiers 20 that serve as additional indicia for identifying the particular connector port.

Various cable keepers 22 may be mounted adjacent to the patch panel 10 in order to more orderly maintain the interconnect cables in place; however, as one can appreciate, when a particular patch panel has a great number of interconnect cables connected thereto, the cables become an unmanageable tangle. In some patch panels, particularly in laboratory environments, there may be hundreds of interconnect cables present, making it difficult to troubleshoot and audit the panel because of the large number of cables present.

Figure 2:
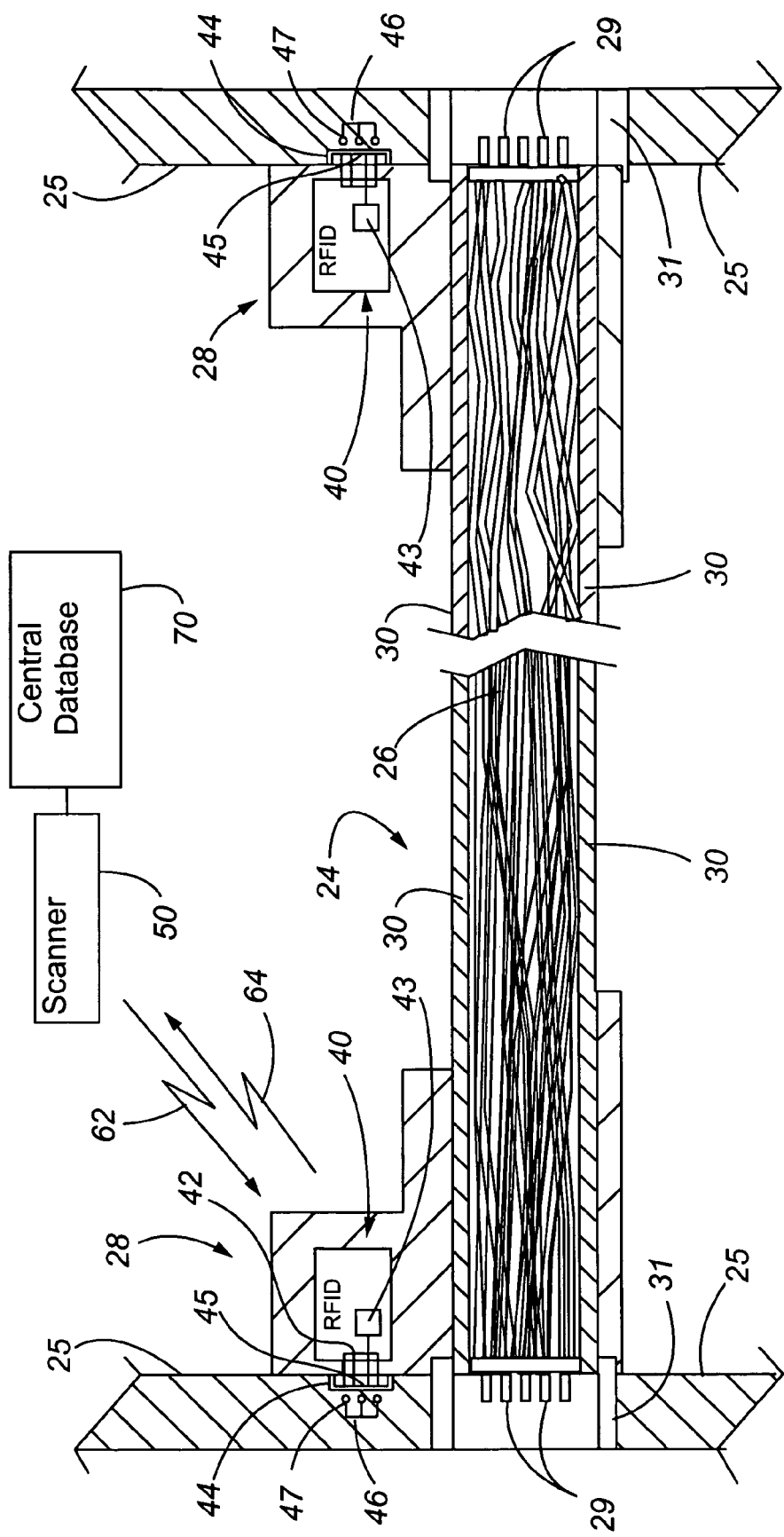
FIG. 2 is a schematic cross-sectional depiction of an interconnect cable and a patch panel/network component in accordance with a first embodiment of the present invention.

Referring to FIG. 2, the interconnect cable and system of the present invention are illustrated. FIG. 2 illustrates an interconnect cable 24 that interconnects a pair of components 25, such as a patch panel, server computer, switch board, or other known computer or communication components. The interconnect cable 24 features connectors 28 attached at opposite ends of the cable. The interconnect cable 24 has a sheath 30, and one or more signal lines 26 housed within the sheath.

In general, the connectors 28 are configured to interconnect with a mating connector port 31 incorporated upon the network component 25. Accordingly, it will be appreciated that the interconnect cable 24 can be deployed to permit signals and/or power to be passed between the components 25.

Furthermore, it shall be understood that the particular type of interconnect cable to be provided may be in the form of a ribbon cable, or any other particular configuration as dictated or suggested by the particular application.

Figure 3:
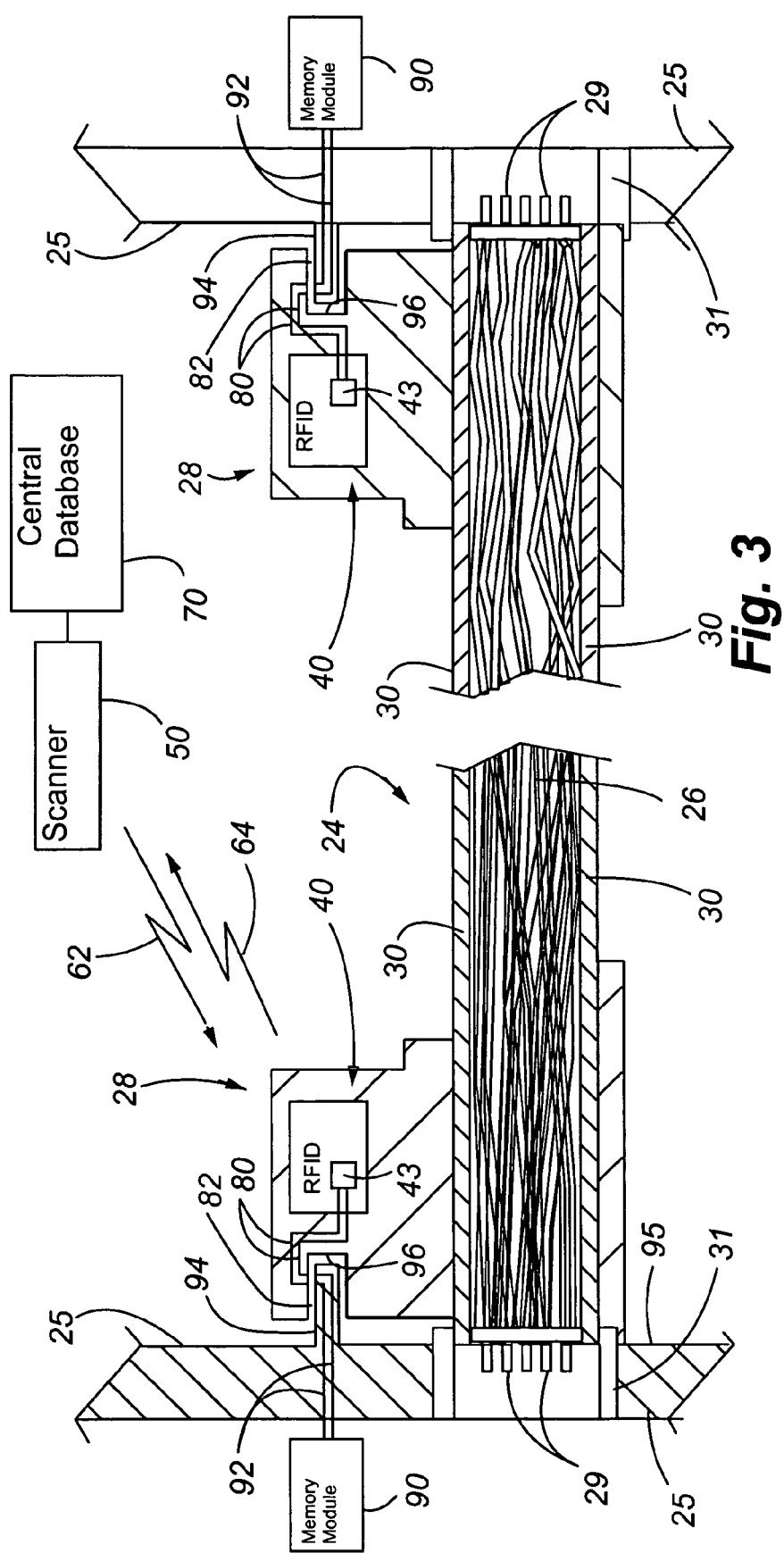
FIG. 3 is a schematic cross-sectional depiction of an interconnect cable and a patch panel/network component in accordance with a second embodiment of the present invention

With further reference to FIG. 2, the arrangement of the interconnect cable 24 is shown in more detail. Each end connector 28 includes a mechanical mating structure 29, which may include interconnection points, pins, contact points or some other structure. FIG. 3 generally illustrates the mating structure in the form of pins 29 which allow the ends of the interconnect signal lines 26 to operably connect to the components 25. The signal lines 26 may comprise electrically conductive signal or optical signal lines. Thus, the interconnect cable 24 in accordance with the embodiments of the present invention may function to operably interconnect devices/components 25 by transferring signals over the signal lines 26.

FIG. 2 also schematically illustrates an RFID transponder 40 housed within the connector 28. The transponder 40 may be active, passive, or semi-active. In the event transponder 40 is an active type, power can be provided through one of the signal lines 26 which receives power from the panel/component 25. A conductor (not shown) can simply interconnect the transponder 40 with the designated power signal line 26.

In this first embodiment, a set of primary contacts 42 have first ends thereof electrically coupled to a memory element 43 of the transponder 40. The second or opposite ends of the contacts 42 may be exposed in a male coupling 45 that is received in a female coupling or connection point 44 formed in the component 25 directly adjacent to port 31. The female coupling 44 includes a set of secondary contacts 46 that are unique to that particular port location in the panel/component. In the example of FIG. 2, there are three contact points 47 that are wired in a particular combination and which then make contact with the primary contacts 42 when the male coupling 45 is connected. The circuit that is completed between the primary and secondary contacts results in the generation of a unique identification signal that is stored in the memory element 43. Depending upon the number of connection ports 31 present in a particular panel or component, the number of primary and secondary contact combinations can be provided enabling the generation of a unique identification signal for each coupler 28 connected to each panel/component port.

When it is desired to record or confirm a network connection, an RFID scanner 50 may be wanded over the connector 28 of interest. As the scanner passes over the connector, the scanner 50 generates an interrogating radio signal 62. In response, the RFID transponder 40 generates a radio signal 64 carrying the unique identifier. The scanner 50 receives and records the signal 64. The unique identifier may then be downloaded to a central database 70 for recordation or manipulation, as desired.

Although FIG. 2 illustrates a male/female coupling arrangement for connection of the primary and secondary contacts, those skilled in the art can envision other particular arrangements whereby the primary and secondary contacts may be placed in contact with one another for purposes of completing a circuit for generation of the unique identifier. Additionally, it shall be understood that while FIG. 2 illustrates a separate connection structure for mating of the primary and secondary contacts, the connector port 31 itself can be adapted for facilitating mating of the contacts wherein the primary contacts could extend alongside mechanical mating structure 29, and the secondary contacts could be placed within a designated area of port 31 for contact with the primary contacts.

Referring to FIG. 3, a second embodiment of the present invention is illustrated wherein capacitive coupling is used for transmitting location/identity data from the component 25 to the memory element 43 of the transponder 40. This embodiment is similar to the first embodiment in that the RFID device is mounted to the connector 28, but the primary/secondary contact scheme is eliminated. As shown in this embodiment, the transponder 40 has a pair of conductors 80 that are electrically coupled to the memory element 43, and the component 25 has its own memory element or module 90 with a pair of conductors 92 extending therefrom. Module 90 stores data reflective of the identity of each particular connection port in the component 25. FIG. 3 more particularly illustrates the component 25 having a male coupling part 94 that extends beyond the face 95 of the component, and which is received within a female coupling part 96 formed in the coupler 28. The ends of conductors 92 extend along the male coupling part 94 and terminate in close proximity to the ends of conductors 80, the conductors 92 and 80 separated by a gap 82. In response to a voltage applied across conductors 92, a first electric field is generated carrying the unique identification signal from module 90 that identifies the particular panel/component location where the cable 24 is connected. This electric field extends beyond the surface of the male coupling part 94 and induces a charge separation on conductors 80, resulting in transmission of the unique panel/component port identification signal to memory element 43. This signal along with data bits stored in element 43 which identify the particular cable 24 may then be transmitted to the scanner 50 when the scanner 50 interrogates the transponder 40.

Although FIG. 3 illustrates a male/female coupling arrangement, it shall again be understood that other coupling arrangements can be used that would facilitate capacitive coupling between the module 90 of the component 25 and the memory element 43 of the transponder 40. For example, the connector 28 could incorporate a male coupling part and the component 25 could incorporate a female coupling part adapted to receive the male coupling part. Further for example, the male/female arrangement could be eliminated in favor of a simple flat interface between the coupler 28 and the face 95 of component 25 wherein the ends of conductors 92 and 80 extend closely adjacent to the opposing surfaces and the gap between the pairs of conductors is set so that the electric field generated by conductors 92 would be sufficiently powerful enough to create the charge separation in conductors 80 for data transmission to the memory element 43.

In another aspect of the present invention, it is contemplated that the scanner 50 could be directly incorporated within the structure of the panel/component 25, and the scanner could periodically scan the entire panel/component 25 for real-time updates to changes in panel/component connections. According to this aspect of the invention, the scanner 50 itself could be included as a network accessible device wherein a user could periodically check the status of network connections. Depending upon the size of a particular panel/component and the number of port connections found within the panel/component 25, it may be desirable to centrally locate the scanner 50 on the panel/component 25 so that the interrogation signals generated by the scanner can effectively cover all panel/component connections.

The advantages of the present invention are clear. The present invention provides a solution for quickly, easily, and accurately auditing connections in a network. The automated nature of the solution eliminates paper logs or other manual data entry steps which otherwise compromise accurate and timely network auditing. The present invention also utilizes inexpensive hardware in the form of RFID transponders and RFID readers that have proven to be very reliable in other industrial applications.

The particular embodiments described above are intended to explain the best mode presently known in practicing the invention and to enable others skilled in the art to utilize the invention in such or in other embodiments and with various modifications required by their particular application or use of the invention. Therefore, it is intended that the appended claims be construed to include the alternative embodiments to the extent permitted by the prior art.

What is claimed is:

1. A system for identifying ends of an interconnect cable connected between a pair of components of a network, said system comprising:
   an interconnect cable having a first end connector attached at one end of said cable, a second end connector attached at an opposite end of said cable, an outer sheath, and at least one signal conductor disposed within said sheath;
   at least one RFID transponder mounted in one of said first and second end connectors of said cable;
   an RFID scanner communicating with said RFID transponder for selectively querying said transponder thereby receiving and storing information reflective of the identity of the end connector; and
   each said RFID transponder has a plurality of primary contacts electrically coupled to said corresponding memory element, and each component interconnected by said cable has a plurality of secondary contacts wherein contact of the primary contacts with the secondary contacts completes a circuit to each memory element thereby generating the identification data for storage in each memory element.

2. A system for identifying ends of an interconnect cable connected between a pair of components of a network, said system comprising:
   an interconnect cable having a first end connector attached at one end of said cable, a second end connector attached at an opposite end of said cable, an outer sheath, and at least one signal conductor disposed within said sheath;
   a first RFID transponder mounted to said first end connector and a second RFID transponder mounted to said second end connector of said cable;

a first memory module incorporated in a first component of said pair of components, and a second memory module incorporated in a second component of said pair of components, said first RFID transponder communicating with said first memory module for receiving information reflective of the connection port to which the first end is connected, and said second RFID transponder communicating with said second memory module for receiving information reflective of the connection port to which the second end is connected;

an RFID scanner communicating with said first and second RFID transponders for selectively querying said transponders thereby receiving and storing information reflective of the identity of the end connectors; and each said RFID transponder has a plurality of primary contacts electrically coupled to a corresponding memory element of each RFID transponder, and each component interconnected by said cable has a plurality of secondary contacts wherein contact of the primary contacts with the secondary contacts completes a circuit to each memory element thereby generating the information reflective of the identity of the end connectors and the locations on the components where said cable is connected.

3. An interconnect cable comprising:

a first end connector attached at one end of said cable;

a second end connector attached at an opposite end of said cable;

at least one signal conductor disposed in said cable;

a first RFID transponder integral with said first end connector; and a second RFID transponder integral with said second end connector, and each said RFID transponder further includes a plurality of primary contacts electrically coupled to said corresponding memory element, and each component interconnected by said cable has a plurality of secondary contacts wherein contact of the primary contacts with the secondary contacts completes a circuit to each memory element thereby generating an identification signal for uniquely identifying the ends of the cable and the identity of the components to which the cable is connected.

4. A cable, as claimed in claim 3, wherein:

said first and second RFID transponders each further include a corresponding memory element incorporated therein for storage of identification data for uniquely identifying the ends of the cable.

* * * * *